(12) United States Patent
Kim et al.

(10) Patent No.: US 8,367,197 B2
(45) Date of Patent: Feb. 5, 2013

(54) COMPOSITION FOR RIGID POLYURETHANE FOAM AND RIGID POLYURETHANE FOAM PRODUCED USING THE SAME

(75) Inventors: Kwang Hee Kim, Seoul (KR); Myung Dong Cho, Gyeonggi-do (KR); Sang Ho Park, Yongin-si (KR); Sung Woo Hwang, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 460 days.

(21) Appl. No.: 12/647,086

(22) Filed: Dec. 24, 2009

(65) Prior Publication Data
US 2010/0159232 A1    Jun. 24, 2010

(30) Foreign Application Priority Data
Dec. 24, 2008 (KR) .................. 10-2008-0133068

(51) Int. Cl.
*B32B 3/26* (2006.01)
*C09K 3/00* (2006.01)
*C08G 18/32* (2006.01)

(52) U.S. Cl. ........... 428/315.5; 252/182.24; 252/182.26; 521/170

(58) Field of Classification Search ............... 428/315.5; 252/182.24, 182.26; 521/170
See application file for complete search history.

(56) References Cited

U.S. PATENT DOCUMENTS

| | | | |
|---|---|---|---|
| 4,419,457 | A | 12/1983 | Tokunaga |
| 5,318,996 | A | 6/1994 | Yu-Hallada et al. |
| 2006/0178443 | A1 | 8/2006 | Boinowitz et al. |

FOREIGN PATENT DOCUMENTS

| | | |
|---|---|---|
| JP | 01-168717 | 7/1989 |
| JP | 2006036885 | 2/2006 |
| KR | 1020050073500 A | 7/2005 |
| WO | 9961504 | 12/1999 |
| WO | 2008043837 A1 | 4/2008 |

OTHER PUBLICATIONS

European Search Report dated Apr. 13, 2010.

*Primary Examiner* — Thao T. Tran
(74) *Attorney, Agent, or Firm* — Cantor Colburn LLP

(57) ABSTRACT

A composition for a rigid polyurethane foam with reduced cell sizes contains a polyol, water, a catalyst, a blowing agent; and an ionic liquid. The rigid polyurethane foam is produced by adding an ionic liquid as an eco-friendly additive to a polyol composition so as to improve insulation efficiency thereof.

9 Claims, 5 Drawing Sheets

COMPOSITION FOR RIGID POLYURETHANE FOAM AND RIGID POLYURETHANE FOAM PRODUCED USING THE SAME

CROSS-REFERENCE TO RELATED APPLICATIONS

This application claims priority to Korean Patent Application No. 2008-133068, filed on Dec. 24, 2008, and all the benefits accruing therefrom under 35 U.S.C. §119, the contents of which in its entirety are herein incorporated by reference.

BACKGROUND

1. Field

This disclosure relates to a composition for a rigid polyurethane foam and a rigid polyurethane foam produced using the same. This disclosure relates more particularly, to a rigid polyurethane foam with improved insulation efficiency, fabricated using an eco-friendly additive.

2. Description of the Related Art

In order to utilize a material as thermal insulation, it is desirable that the material have a low density and display buffer (or cushioning) properties to stimuli such as, for example, sound, impact and/or shock. Polyurethane foams are used as thermal insulation materials because of their low density and because of their ability to serve as a barrier against the propagation of sound or heat and to serve as a buffer against impact and/or shock. Polyurethane foams can be used as light weight construction materials, buffer materials, and the like, either alone or in combination with other materials. In particular, a rigid polyurethane foam having the lowest thermal conductivity among commonly available insulation materials exhibits excellent thermal insulation properties, and therefore, is broadly employed in fabrication of various thermal insulation materials for refrigerators, construction applications, and the like, and/or in the manufacture of electronics, where a high insulation efficiency is desirable.

Recently, in order to improve insulation efficiency (often referred to as "k-factor") of such rigid polyurethane foam, a great deal of studies and investigations have been conducted. The thermal conductivity of the polyurethane foam generally includes about 50 to about 65% of thermal conductivity due to gas conductivity, about 15 to about 20% of thermal conductivity due to conductivity of the solid components (hereinafter solids conductivity) and about 20 to about 30% of thermal conductivity due to conductivity by radiation. Attempts to decrease the size of discrete cells in a polyurethane foam have been carried out in order to reduce the thermal conductivity of the foam. It is known that such results are achieved by improvement in the efficiency of thermal insulation owing to the inhibition of heat transfer via radiation, thereby leading to a reduction in thermal conductivity. In order to decrease the size of the discrete cells in the polyurethane foam, a proposal has been made to increase the amount of nucleating agent to produce a larger number of cells that are of a smaller size than a comparative foam that uses a smaller amount of the same nucleating agent. As a result, the size of each cell is decreased thereby enhancing insulation efficiency. Some of the nucleating agents and blowing agents used for the production of polyurethane forms are not environmentally friendly. It is therefore desirable to improve the insulating efficiency of a rigid polyurethane foam by using an eco-friendly additive.

SUMMARY

Disclosed herein is a composition for production of a rigid polyurethane foam, including an additive useful for improving insulation efficiency of the rigid polyurethane foam.

Disclosed herein too is a rigid micro-porous polyurethane foam with improved insulation efficiency while having discrete cells with reduced size when compared with a comparative polyurethane foam that does not contain ionic liquids as an additive.

Yet another aspect of the disclosure is to provide an insulation material including a rigid polyurethane foam with improved insulation efficiency when compared with a comparative polyurethane foam that does not contain ionic liquids as an additive.

Disclosed herein too is a composition for fabrication of a rigid polyurethane foam, including a polyol, an isocyanate, water, a catalyst, a blowing agent and an ionic liquid.

Disclosed herein too is a composition for fabrication of a rigid polyurethane foam, including a polyol, water, a catalyst, a blowing agent and an ionic liquid.

An ionic liquid may contain cations or anions having halogen groups (e.g., fluorine) and may have imidazolium cations, pyridinium cations, pyrrolidinium cations, quaternary ammonium cations, quaternary phosphonium based cations, and a combination including at least one of the foregoing cations or anions.

Disclosed herein too is a rigid polyurethane foam including an ionic liquid. The rigid polyurethane foam may be fabricated by reacting a polyol component with an isocyanate component in the presence of water, a catalyst, a blowing agent and an ionic liquid. Each cell included in the polyurethane foam may be of a size of about 150 to about 300 micrometers ("μm"), however, this size may be slightly further decreased according to environments used during the fabrication of the polyurethane foam. The polyurethane foam may have a density in the range of about 25 to 35 kilograms per cubic meter ("kg/m$^3$").

Disclosed herein too is a thermal insulation material including the polyurethane foam described above.

Yet another embodiment of the disclosure is to provide a rigid polyurethane foam that contains the ionic liquid additive described above.

The ionic liquid described above is an eco-friendly additive that does not release fluorine gas. Accordingly, the disclosed polyurethane foam may eliminate environmental regulation problems, may be used without a substantial loss of a raw material since the ionic liquid having a high boiling point of above 200° C. does not evaporate during urethane curing, and may enhance insulation efficiency of a polyurethane foam when used as a nucleating agent for fabrication of the polyurethane foam.

Disclosed herein too is a method comprising mixing together a polyol, water, a catalyst, a blowing agent, and an ionic liquid to form a polyol solution; and mixing the polyol solution with a polyisocyanate to produce a rigid polyurethane foam.

BRIEF DESCRIPTION OF THE DRAWINGS

The above and other aspects, advantages, and features of the disclosure will become more apparent by describing in further detail exemplary embodiments thereof with reference to the attached drawings, in which.

DETAILED DESCRIPTION

Figure 1:
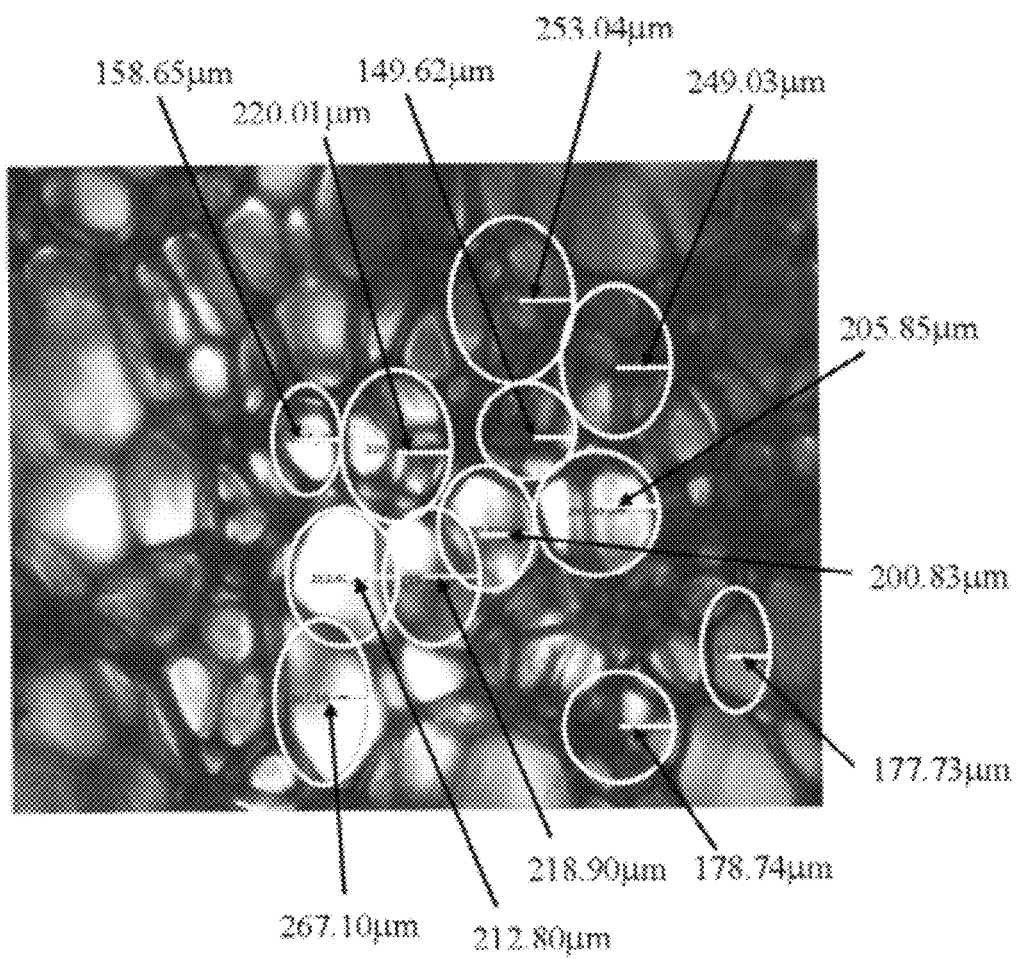
FIGS. 1 to 3 are scanning electron microscope ("SEM") images showing a rigid polyurethane foam fabricated by adding an ionic liquid.
Figure 2:
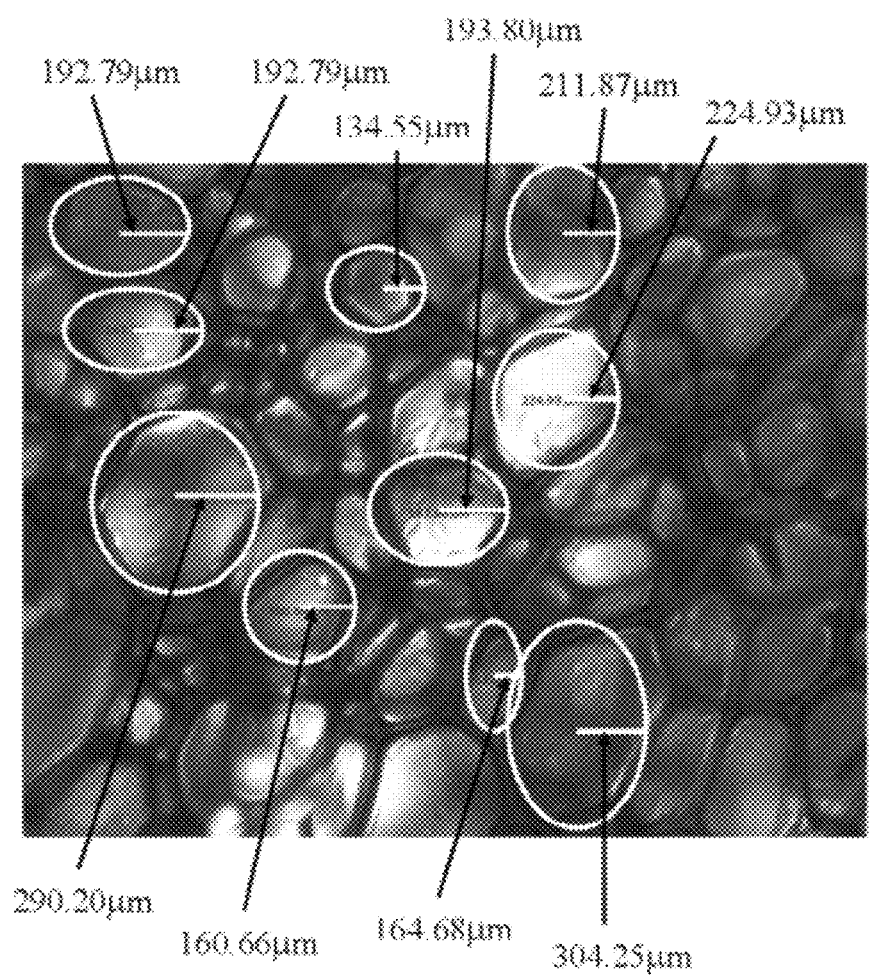
Figure 3:
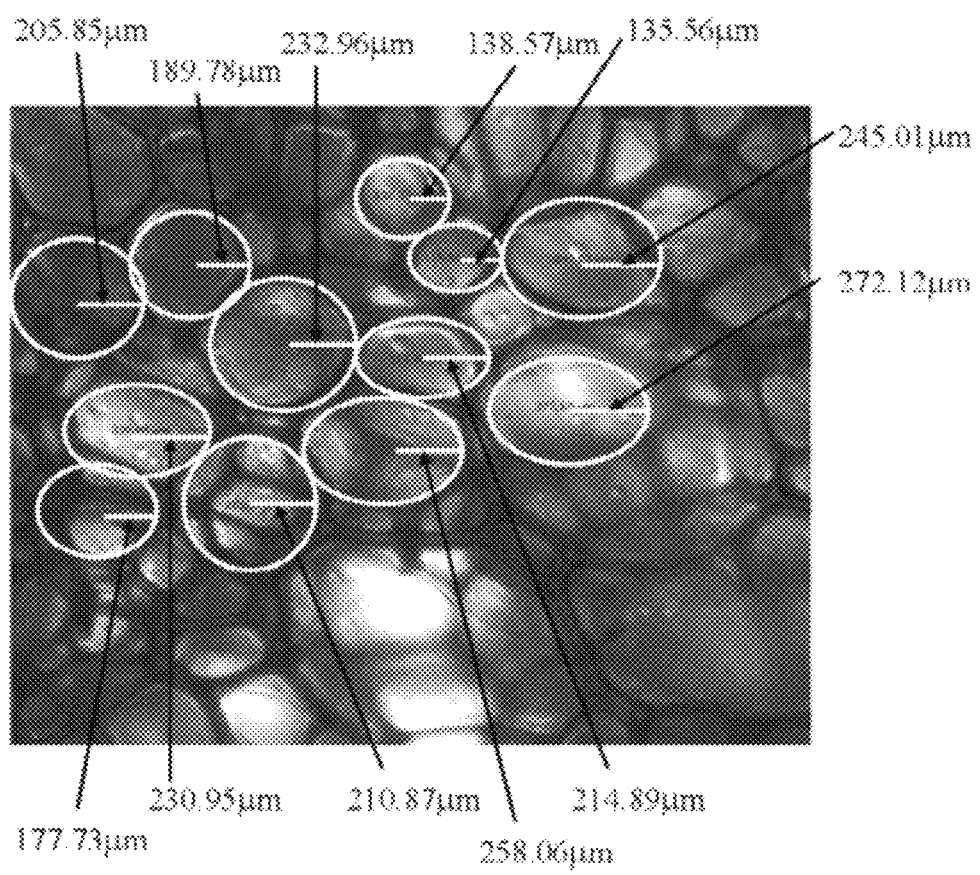
Figure 4:
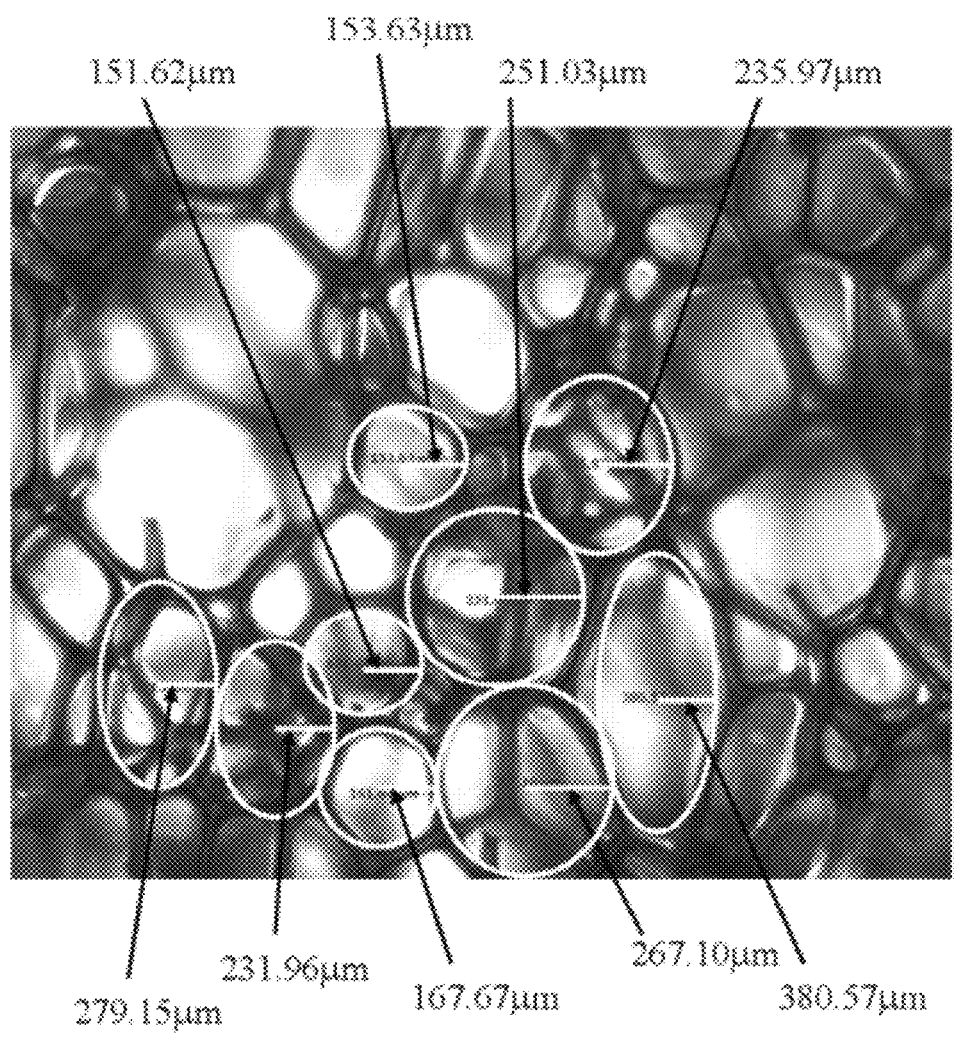
FIG. 4 is an SEM image showing a rigid polyurethane foam fabricated without addition of an ionic liquid.

Hereinafter, exemplary embodiments of the disclosure will be described in greater detail with reference to the accompanying drawings.

The exemplary embodiments of the invention, however, may be embodied in many different forms, and should not be construed as being limited to the embodiments set forth herein. Rather, these embodiments are provided so that this disclosure will be thorough and complete and will fully convey the concept of the invention to those skilled in the art. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., can be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the exemplary embodiments of the invention.

Spatially relative terms, such as "below," "lower," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device can be otherwise oriented (rotated 90 degrees or at other orientations) and the spatially relative descriptors used herein interpreted accordingly.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Disclosed herein is a composition for fabrication of a rigid polyurethane foam including an ionic liquid, a polyol, an isocyanate, water, a catalyst and a blowing agent.

Disclosed herein too is a composition for fabrication of a rigid polyurethane foam including an ionic liquid, a polyol, water, a catalyst and a blowing agent.

The thermal conductivity of an insulating material is generally dependent upon the thermal conductivity of the gas contained in the cells of the foam; the thermal conductivity of the struts of the foam and the mode of permeability of radiation through the foam. In general, the thermal conductivity of an insulating rigid polyurethane foam is dependent in an amount of about 50 to about 65% upon the thermal conductivity of the gas present in closed cells of the rigid polyurethane foam. The gas enclosed in the closed cells may be a blowing agent. In one embodiment, the cells may be discrete cells that do not permit the enclosed gas to transfer from one cell to another.

The thermal conductivity of an insulating rigid polyurethane foam is further about 15 to about 20% dependent upon the conductivity of the solids in a urethane resin polymer component (e.g., the struts of the foam and/or the cell walls); and about 20 to about 30% dependent upon the mode of radiation permeability between the closed discrete cells of the foam.

Among these influences, the thermal conductivity due to the gas and that due to the solids (e.g., the struts and/or the cell walls) are not significantly different between various types of rigid polyurethane foams. However, the contribution to overall thermal conductivity of the rigid polyurethane foam can be reduced by decreasing the radiation permeability. Reducing the cell size facilitates a decrease in the radiation permeability.

The rigid polyurethane foam can be manufactured from a rigid polyurethane foam composition that includes a desirable ionic liquid in order to decrease the size of the discrete cell, thereby enhancing the thermal insulation efficiency of the foam. The ionic liquid includes a liquid salt, which does not undergo evaporation at room temperature and exhibits a high polarity and specific heat. Adding a small amount of the ionic liquid to a polyol composition facilitates a reduction in thermal conductivity of the fabricated polyurethane foam.

Without being limited to theory, it is believed to that the addition of the ionic liquid to the polyurethane composition promotes the formation of a considerably larger free volume in a polyol liquid solution than would be otherwise available. This increases the solubility of gases, such as air, for polyol contained in the solution; and therefore, discrete cells of the polyurethane foam produced after blowing have a decreased size and exhibit reduced heat transfer via radiation, thereby enhancing overall insulation efficiency of the foam. In other words, the presence of the ionic liquid increases the free volume of the polyol solution and the number of nucleation sites and therefore increases the cell density per unit volume. This results in smaller cell sizes.

Without being limited to theory, the radiation heat transfer is inhibited by decreasing the size of each cell (or the average size of all cells) constituting the polyurethane foam to induce a reduction in the thermal conductivity, resulting in improved insulation efficiency of the polyurethane foam. Moreover, the ionic liquid used herein is an eco-friendly additive that does not release fluorine gas into the environment, thus avoiding problems with environmental regulations and reducing environmental damage. Since the ionic liquid has a high boiling point of above 200° C., it does not evaporate during the curing of the rigid polyurethane foam. The inability of the ionic liquid to evaporate prevents the loss of any raw materials from the polyurethane foam composition. In addition, if halogen groups (e.g., fluorine, chlorine, bromine) are contained in the cations or the anions of the ionic liquid, the hydrophobic properties of the rigid polyurethane foam are improved. As a result, the ionic liquid improves the affinity of the polyurethane foam composition to air when the polyol is mixed with a polyisocyanate liquid under agitation, thereby generating microfine air bubbles in the polyol mixture. As noted above, the hydrophobic nature of ionic liquids containing halogens may also promote an increase in the number of nucleation sites, thus leading to a larger number of finer cells, which reduce the thermal conductivity of the foam, and consequently increase the thermal insulating capacity of the foam.

Alternatively, the ionic liquid displays a strong ability to solubilize the polyol and the polyisocyanate when compared with comparative polyurethane foams that contain perfluorocarbons as nucleating agents. Therefore, the presence of the ionic liquid may prevent the loss of some volatile raw materials because of the increased compatibility of the ionic liquid with the polyol and the polyisocyanate, both of which have hydrophilic properties. In contrast, there is a significant loss of volatile raw materials in comparative polyurethane foams that contain highly hydrophobic perfluorocarbon substances as nucleating agents. This loss of volatile raw materials is because the highly hydrophobic perfluorocarbon substances have a poor compatibility with the polyol and the polyisocyanate, thereby being susceptible to phase separation from the polyols and the polyisocyanates. Further, the improved compatibility of the ionic liquid with the polyol results in an improved compatibility of the perfluorocarbon blowing agent with the polyol medium, which results in an smaller cell sizes and an increased cell density.

The ionic liquid described above may have halogen groups in the cations or anions and may further contain imidazolium cations, pyridinium cations, pyrrolidinium cations, quaternary ammonium cations, quaternary phosphonium based cations and combinations comprising at least one of the foregoing cations.

The ionic liquid may be represented by Formula 1, below $$A^+X^- \qquad \text{Formula 1}$$

wherein the cation $A^+$ is a cation including N or P with oxidation number +1 and the anion $X^-$ is an anion including at least a halogen atom, S, N, P, C, or O with oxidation number −1.

The cation $A^+$ may be selected from the group consisting of

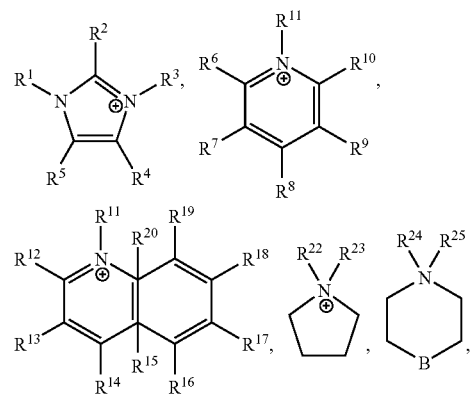

$R^{26}R^{27}R^{28}R^{29}N^+$ and $R^{30}R^{31}R^{32}R^{33}P^+$, wherein $R^1$ to $R^{33}$ each are independently hydrogen, an alkyl or heteroalkyl having 1 to 20 carbon atoms, an alkenyl or heteroalkenyl having 1 to 20 carbon atoms, an alkoxyl or heteroalkoxyl having 1 to 20 carbon atoms, an aryl or heteroaryl having 4 to 20 carbon atoms, a fluoroalkyl having 1 to 20 carbon atoms, or cyano group; B is carbon, oxygen or nitrogen.

The anion $X^-$ may be selected from the group consisting of halogen, $R^{41}SO_3^{--}$, $PR^{42}{}_iF_{6-i}^-$, $AsR^{42}{}_iF_{6-i}^-$, $SbR^{42}{}_iF_{6-i}^-$, $R^{43}R^{44}N^-$, $-$, $R^{45}OSO_3^-$), $R^{46}CO_2^-$, $PR^{47}{}_jO_{4-j}^-$, $BR^{48}{}_kF_{4-k}^-$), $NO_3^-$, $AlCl_4^-$, $Al_2Cl_7^-$, $FeCl_4^-$ and $ClO_4^-$, wherein $R^{41}$ is a hydrogen, an alkyl having 1 to 20 carbon atoms, an alkenyl having 1 to 20 carbon atoms, an alkoxyl having 1 to 20 carbon atoms, an aryl or heteroaryl having 4 to 20 carbon atoms, or a fluoroalkyl having 1 to 20 carbon atoms, $R^{42}$ is a fluoroalkyl having 1 to 20 carbon atoms and wherein $0 \leq i \leq 6$, $R^{43}$ or $R^{44}$ are independently a hydrogen, an alkyl having 1 to 20 carbon atoms, an alkenyl having 1 to 20 carbon atoms, an alkoxyl having 1 to 20 carbon atoms, a fluoroalkyl having 1 to 20 carbon atoms, cyano, or $R'SO_2$ wherein R' is a hydrogen, an alkyl having 1 to 20 carbon atoms, or a fluoroalkyl having 1 to 20 carbon atoms, $R^{45}$ is a hydrogen, an alkyl having 1 to 20 carbon atoms, an alkoxyl having 1 to 20 carbon atoms, or a fluoroalkyl having 1 to 20 carbon atoms, $R^{46}$ is a hydrogen, an alkyl or heteroalkyl having 1 to 20 carbon atoms, an alkoxyl having 1 to 20 carbon atoms, or a fluoroalkyl having 1 to 20 carbon atoms, $R^{47}$ is an alkyl having 1 to 20 carbon atoms, or an alkoxyl having 1 to 20 carbon atoms wherein $0 \leq j \leq 4$, and $R^{48}$ is a fluoroalkyl having 1 to 20 carbon atoms wherein $0 \leq k \leq 4$.

For example, the anion $X^-$ may be selected from the group consisting of $Cl^-$, $Br^-$, $I^-$, $PF_6^-$, $SbF_6^-$, $AsF_6^-$, $PR^{42'}{}_3F_3^-$, $AsR^{42'}{}_3F_3^-$, $SbR^{42'}{}_3F_3^-$ (wherein $R^{42'}$ is a fluoroalkyl having 1 to 6 carbon atoms), $CH_3SO_3^-$, $CF_3SO_3^-$, $CF_3C_6F_4SO_3^-$, $CF_3C_6H_4SO_3^-$, $CH_3C_6H_4SO_3^-$, $HSO_4^-$, $R^{45'}SO_4^-$ (wherein $R^{45'}$ is an alkyl having 1 to 6 carbon atoms or a fluoroalkyl having 1 to 6 carbon atoms) (e.g., $CH_3SO_4^-$, $CH_3CH_2OSO_3^-$, $CF_3SO_4^-$); $CH_3(OCH_2)_lOSO_3^-$, $CH_3(OCH_2CH_2)_lOSO_3^-$ (wherein $1 \leq l \leq 6$) (e.g., $CH_3(OCH_2)OSO_3^-$), $CH_3(OCH_2CH_2)OSO_3^-$); $(R'SO_2)(R''SO_2)N^-$ (wherein R' and R'' are independently a fluoroalkyl having 1 to 6 carbon atoms) (e.g., $(CF_3SO_2)_2N^-$, $(C_2F_5SO_2)_2N^-$, $(C_2F_5SO_2)(CF_3SO_2)N^-$); $(NC)_2N^-$, $R^{45'}CO_2^-$, $R^{45'}CH(OH)CO_2^-$, (wherein $R^{45'}$ is an alkyl having 1 to 6 carbon atoms) (e.g., $CH_3CO_2^-$, $CH_3CH(OH)CO_2^-$), $CF_3(CF_2)_mCO_2^-$ (wherein $0 \leq m \leq 17$, specifically $1 \leq m \leq 15$, and more specifically $3 \leq m \leq 13$); $R^{47'}{}_2PO_2^-$ (wherein $R^{47'}$ is an alkoxyl having 1 to 6 carbon atoms); (e.g., $(CH_3O)_2PO_2^-$)), $BF_4^-$, $NO_3^-$, $AlCl_4^-$, $Al_2Cl_7^-$, $FeCl_4^-$, $ClO_4^-$, and toluene sulfate.

The cation A+ of the ionic liquid may be selected from the group represented by the Formula 2.

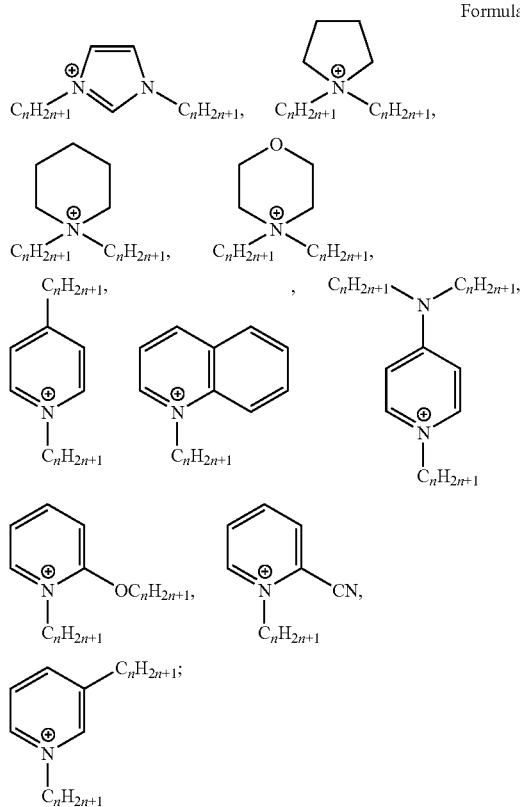

Formula 2 and a combination comprising at least one of the compounds of the Formula 2; wherein n is an amount of up to 20, specifically about 1 to about 18, and more specifically about 2 to about 15.

The ionic liquid may be selected from the group represented by Formulae 3 to 9.

and a combination comprising at least one of the foregoing ionic liquids of the Formulas 3 through 9.

Adding the ionic liquid or the ionic liquids listed above to a composition for fabrication of a polyurethane foam may serve as a nucleating agent to enhance the miscibility of air with the mixed solution of the polyurethane composition which increases the number of fine air bubbles entrapped in the solution and assists generation of microfine pores. Consequently, the ionic liquid functions to improve the thermal insulation efficiency of the foam.

Moreover, the ionic liquid can also interact with silicon-based surfactants often used in manufacturing of a polyurethane foam, so as to enhance the stabilization of fine bubbles generated when the polyol is mixed with the polyisocyanate solution.

The ionic liquid described above may be added to the polyol in an amount of about 0.5 to about 30 parts by weight (hereinafter referred to as "wt. parts"), specifically about 1 to about 10 wt. parts, more specifically about 1 to about 5 wt. parts, and most specifically about 2 to about 4 wt. parts relative to 100 wt. parts of polyol.

The polyol is prepared by reacting an initiator such as a multi-functional alcohol having at least two hydroxyl groups (—OH) and/or amine groups (—NH$_2$), aromatic amine, and the like, with propylene oxide (PO) or ethylene oxide (EO) under desired conditions.

Polyols, such as, for example, polyether polyols and polyester polyols may be used in the polyurethane composition. Polyols may be selected from the group consisting of ethyleneglycol, diethyleneglycol, triethyleneglycol, tetraethyleneglycol, polyethyleneglycol, propyleneglycol, dipropyleneglycol, polypropyleneglycol, butyleneglycol, polybutyleneglycol, 1,6-hexanediol, cyclohexane dimethanol, neopentylglycol, polycaprolactone, bisphenol A polyol, polyether polyol, toluenediamine polyol, glycerin polyol, trimethylolpropane polyol, sucrose glycerin polyol, and a combination comprising at least one of the foregoing polyols. The ionic liquid may also include polyols that are used in the fabrication of a rigid polyurethane foam.

In general, polyols having a hydroxyl value of about 300 to about 600 are used, specifically about 350 to about 550, and more specifically about 375 to about 450 are used in the manufacturing of a rigid polyurethane foam fabrication.

A process for blowing by blending the polyol with a polyisocyanate may broadly include a chemical blowing method using water and a physical blowing method using a blowing agent.

In the chemical blowing method, water reacts with the polyisocyanate to accelerate the initial reaction and generates carbon dioxide. The carbon dioxide released as a result of the reaction converts the polyurethane into a foam. When manufacturing an insulating material for use in construction (e.g., residential and commercial building construction, refrigerator construction, and the like), it may be desirable to use other blowing agents in addition to the carbon dioxide that is generated by the chemical blowing method.

In the manufacturing of a thermal insulation material for a refrigerator, additional amounts of the blowing agent may be added to increase the amount of porosity while at the same time decreasing the amount of $CO_2$ gas.

Water may be contained in an amount of about 1.5 to about 3 wt. Parts relative to 100 wt. parts of polyol.

The physical blowing agent may include a hydrocarbon instead of hydrochlorofluorocarbons ("HCFC") and chlorofluorocarbons ("CFC") in compliance with use regulations.

Other physical blowing agents may include hydrocarbon blowing agents, fluorocarbons, and the like. Usable hydrocarbon-containing blowing agents are the HFCs (hydro fluorocarbons) such as 1,1,1,3,3,3-hexafluoropropane, 2,2,4,4 tetrafluorobutane, 1,1,1,3,3,3-hexafluoro-2-methylpropane, 1,1,1,3,3 1 pentafluoropropane, 1,1,1,2,3-pentafluoropropane, 11,1,2,2,3-pentafluoropropane, 1,1,1,3,3,4 hexafluorobutane, 1,1,1,3,3-pentafluorobutane, 1,1,1,4,4,4-hexafluorobutane, 1,1,1,2,3,3 hexafluoropropane, 1,1-difluoroethane, 1,1,1,2-tetrafluoroethane, and pentafluoroethane; the HFE's (hydro fluoroethers) such as methyl-1,1,1 trifluoroethylether and difluoromethyl-1,1,1-trifluoroethylether; and the hydrocarbons such as n-pentane, isopentane, and cyclopentane.

Useful fluorocarbons are the halogen derivatives of methane and ethane, such as methyl fluoride, methyl chloride, difluoromethane, methylene chloride, perfluoromethane, ethyl fluoride, 21,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, perfluorobutane, perfluorocyclobutane, or the like, or a combination comprising at least one of the foregoing blowing agents.

A suitable example of such a blowing agent may be cyclopentane, which does not exhibit adverse effects such as ozone layer depletion, although the blowing agent used herein is not limited thereto. The blowing agent may be used in an amount of about 10 to about 30 wt. parts, specifically about 15 to about 25 wt. parts, and more specifically about 17 to about 23 wt. parts, relative to 100 wt. parts of polyol. Physical blowing may be used in conjunction with chemical blowing if desired.

A catalyst used for reaction between isocyanate and polyol may be any one generally used in the related art and include, for example, an amine based catalyst such as tertiary amine. The catalyst may be an amount of about 2 to about 3 wt. parts per 100 wt. parts of polyol.

The polyurethane composition for fabrication of the rigid polyurethane foam may further include a surfactant. The surfactant may enable raw materials to be compatible with one another and to be easily mixed by emulsification. The surfactant also provides support for the growth (e.g., nucleation) of air bubbles by reducing the urethane surface tension. It further permits the uniform growth of air bubbles by inhibiting diffusion of dissolved gases. This is accomplished by decreasing the difference in pressure of air bubbles and, in addition, preventing closed discrete cells from growing and being irregularly formed.

In addition, the surfactant may solve problems such as the breaking or coalescence of cells, thinning of cell membranes, and the like, due to unstable air bubbles when the viscosity of the composition is increased. The addition of the surfactant also improves fluidity and packing properties of a foam during mold expansion when manufacturing the polyurethane foam. The resultant foam is a product with uniform density and, in the case of a rigid polyurethane foam, the use of surfactants may facilitate and increased closed cell content so as to enhance the thermal insulation efficiency.

The surfactant may include, for example, silicon surfactants, polyurethane surfactants, polyethylene oxide-polypropylene oxide block copolymers, and so forth. The surfactant used herein may be an amount about 2 to about 4 wt. parts to 100 wt. parts of polyol.

In another embodiment, there is provided a rigid polyurethane foam including an ionic liquid. The ionic liquid may be present in the form of a material entrapped in a matrix of the foam (e.g., in the struts or cells of the foam) or be present between a solid matrix and a pore (e.g., be a coating on the cell wall).

The rigid polyurethane foam may be produced by reacting a composition for fabrication of the rigid polyurethane foam, which contains the ionic liquid, with polyisocyanate. Using the ionic liquid as a nucleating agent, the rigid polyurethane foam may exhibit a reduced size of the closed discrete cells, resulting in improved insulation efficiency thereof. Each of the discrete cells in the polyurethane foam may have a cell diameter of about 150 to about 300 micrometers ("μm"), specifically about 200 to about 300 μm, and more specifically about 250 to about 300 μm. However, this size may be varied according to production environments.

The polyurethane foam may have a thermal conductivity of not more than 20.7 milli-watts per meter-Kelvin ("mW/mK"). For instance, although the polyurethane foam usually has a thermal conductivity of about 18.5 to about 20.7 mW/mK, this value may be varied depending on test apparatus, temperature conditions and/or other equipment conditions. Thermal conductivity is generally measured using a heat flow meter. Alternatively, the rigid polyurethane foam may have a density in the range of about 25 to about 35 kilograms per cubic meter ("$kg/m^3$").

As described above, the rigid polyurethane foam may be produced by mixing a polyol solution including water, a catalyst and/or a blowing agent with a polyisocyanate to form a mixture and reacting the mixture. The rigid polyurethane foam is generally manufactured by a two step process. A polyol solution is first manufactured by mixing together a polyol, water, an optional blowing agent, and a catalyst. To the polyol solution is added the desired amount of polyisocyanate to produce the rigid polyurethane foam.

Since a catalyst is highly reactive with a polyisocyanate even at room temperature, a polyisocyanate solution is prepared separately. On the other hand, the polyol solution is prepared in the form of a pre-mixed solution containing some of the other aforementioned additives. Such additives may be mixed simultaneously or sequentially.

In one embodiment, the polyurethane foam may be produced by a process including separately preparing a polyol solution including polyol, water, a catalyst and a blowing agent, as well as polyisocyanate; adding an ionic liquid as a nucleating agent to the polyol solution; and mixing the polyol solution containing the ionic liquid with the above polyisocyanate to proceed reaction thereof.

Polyisocyanate as used herein may include a product prepared by condensation treating aniline and formaldehyde to produce diphenylmethane diamine (MDA) and treating MDA with phosgene ($COCl_2$), (e.g., conducting a phosgenation reaction). It is known that polyisocyanate is present in liquid state at room temperature, has an average functionality of about 2.3 to about 3.0 by mixing isocyanates having functionalities of 2, 3 and 4. Polyisocyanates are generally characterized by viscosity, reactivity and isocyanate (NCO) content (%). The viscosity of a polyisocyanate product depends on weight average molecular weight and NCO content in weight percent. Polyisocyanate used herein may be used in an amount of about 100 to about 150 wt. parts, specifically about 110 to about 115 wt. parts to 100 wt. parts of polyol.

The rigid polyurethane foam fabricated according to exemplary embodiments of the disclosure may be used as an insulation material in various applications requiring high insulation efficiency such as, for example, electronics, refrigerators, LNG cold reefer vessels or LNG cold storage ships, buildings, external walls, transport pipes, and the like.

The foregoing exemplary embodiments of the disclosure will be described in more details by the following examples and experimental example. However, these examples are given for illustrative purpose only without limitation thereof.

Examples 1 to 12

This example is conducted to demonstrate the thermal conductivity of the rigid polyurethane foam. The following ingredients are mixed to prepare a pre-mixed polyol solution: 100 wt. parts of polyol consisting of 60 wt. parts of toluenediamine polyol (hydroxyl ("OH") value: 350 to 550), 20 wt. parts of sucrose glycerin polyol (OH value: 360 to 490), 10 wt. parts of trimethylolpropane polyol (OH value: 350 to 450), 10 wt. parts of glycerin polyol (OH value: 168 to 670); 1.75 wt. parts of water; 2.3 wt. parts of an amine based catalyst; 2.5 wt. parts of a silicon based surfactant; and 16.5 wt. parts of a blowing agent. All of the additives are represented in parts by weight (wt. parts) relative to 100 wt. parts of polyol.

Then, after any one of ionic liquids listed in Table 1 is added to the pre-mixed polyol solution, the mixture is homogeneously blended into a uniform dispersion using a homomixer at 8,000 revolutions per minute ("rpm").

To the prepared polyol dispersion, a polyisocyanate liquid is added in an amount of 112 wt. parts relative to 100 wt. parts of the polyol and strongly agitated for about 10 seconds. The resultant solution is poured into a pre-fabricated acryl plate mold having dimensions of 30 centimeter×30 centimeter×3 centimeter ("cm"). After about 8 to 10 minutes, a rigid urethane foam slab is formed. Following this, the slab is separated from the mold and is placed on a shelf for about one day.

Comparative Example 1

A polyurethane foam is produced according to the same procedure as in EXAMPLE 1, except that an ionic liquid is not added.

TABLE 1

| | Ionic liquid | | Content (relative to 100 wt. parts of polyol) | Thermal conductivity ($10^{-4}$ W/mk) |
|---|---|---|---|---|
| Example | cation | anion | | |
| 1 | 1-butyl-3-methylimidazolium | $PF_6^-$ | 3 | 196.2 |
| 2 | 1-butyl-3-methylimidazolium | $Cl^-$ | 3 | 201.5 |
| 3 | 1-butyl-3-methylimidazolium | $SbF_6^-$ | 3 | 202.7 |
| 4 | 1-butyl-3-methylimidazolium | $(CF_3SO_2)_2N^-$ | 3 | 201.1 |
| 5 | 1-decyl-3-methylimidazolium | $Cl^-$ | 3 | 199.3 |
| 6 | 1-methylimidazolium | $Br^-$ | 4 | 202.7 |
| 7 | 1-methylimidazolium | $Br^-$ | 5 | 204.4 |
| 8 | 1-butylimidazolium | $Br^-$ | 5 | 202.1 |
| 9 | Pyridine | $Br^-$ | 4 | 202.1 |
| 10 | Quinoline | $Br^-$ | 4 | 205.8 |
| 11 | N-methylpyrroline | $Br^-$ | 5 | 202.4 |
| 12 | N—N-dimethyl-4-aminopyridine | $Br^-$ | 5 | 205.1 |
| Comparative Example 1 | X | X | X | 207.6 |

Experimental Example

Each of the polyurethane foams fabricated in Examples 1 to 12 and Comparative Example 1 is subjected to a measurement for determining thermal conductivity. This measurement is made using a heat flow meter HFM 436 lambda by Netzsch Co. and the results are shown in Table 1. In addition, discrete cells of each polyurethane foam fabricated in Examples 1, 2, 5 and Comparative Example are illustrated by SEM images in FIGS. 1 to 4, respectively.

Figure 5:
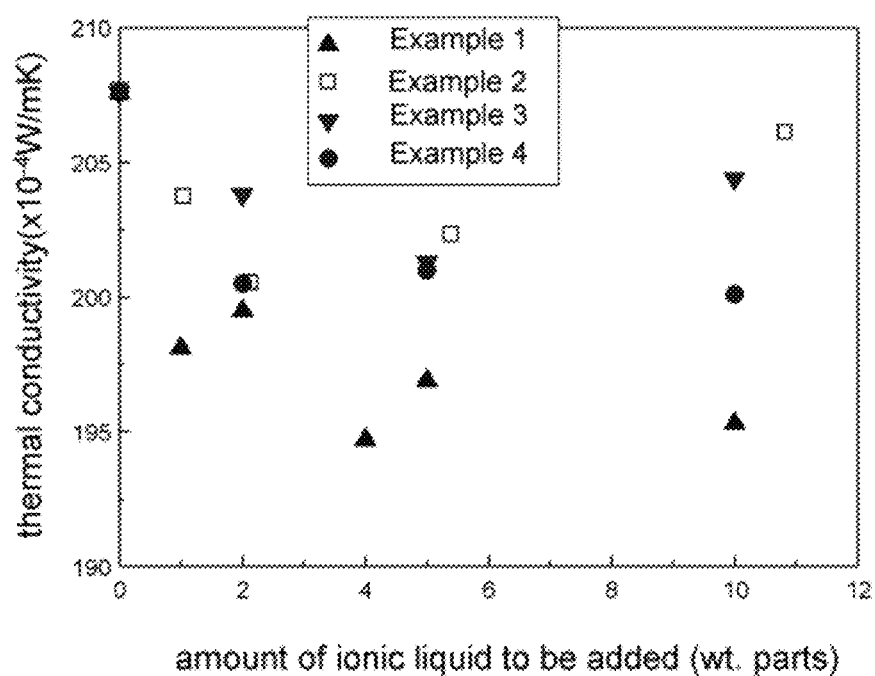
FIG. 5 illustrates a graph that shows a variation in thermal conductivity depending on an amount of an ionic liquid used in the rigid foam.

Moreover, as an amount of the ionic liquid in each of Examples 1 to 4 increases from about 0 wt. part to about 11 wt. parts relative to 100 wt. parts of polyol, corresponding thermal conductivities are measured, and the results are shown in the FIG. 5. Referring to FIG. 5, it can be seen that thermal conductivity is reduced by adding the ionic liquid, compared with the Comparative Example, where the ionic liquid is not added. Moreover, when the ionic liquid is added in the amount of about 0.5 to about 10 wt. parts, the polyurethane foam exhibits more reduced thermal conductivity.

Referring to Table 1, compared to Comparative Example 1 for a polyurethane foam without addition of an ionic liquid, it can be seen that adding the ionic liquid may relatively reduce thermal conductivity of the foam. Referring to FIGS. 1 to 4, it is found that discrete cells in the polyurethane foam fabricated by adding the ionic liquid have a smaller size than those in the polyurethane foam fabricated without addition of the ionic liquid. For instance, the polyurethane foams produced in Examples 1, 2 and 5 of FIGS. 1 to 3 have discrete cells with sizes of less than or equal to about 300 μm, for example, from about 200 μm to about 300 μm. However, as for the polyurethane foam produced in Comparative Example 1 of FIG. 4, each of the discrete cells has a size of more than about 300 μm, which is relatively larger than those in the above examples, for example, about 380 μm.

As is apparent from the above experimental results, it is identified that adding an ionic liquid may produce a polyurethane foam with smaller cells to reduce overall thermal conductivity, thereby improving insulation efficiency of the foam.

The disclosed embodiments have been described in detail with reference to the foregoing exemplary embodiments. However, these exemplary embodiments are proposed for illustrative purposes only and those skilled in the art will appreciate that various modifications and variations are possible, without departing from the scope and spirit of the disclosure. Accordingly, the scope of subject matters to be protected may be defined only by the appended claims.

What is claimed is:

1. A rigid polyurethane foam comprising:
an ionic liquid; wherein the ionic liquid is represented by Formula 1:

$$A^+X^-  \quad \text{Formula 1}$$

wherein the cation $A^+$ is a cation including N or P with oxidation number +1 and the anion $X^-$ is an anion including at least a halogen, S, N, P, C, or O with oxidation number −1; wherein the cation $A^+$ of the ionic liquid is at least one selected from the group consisting of:

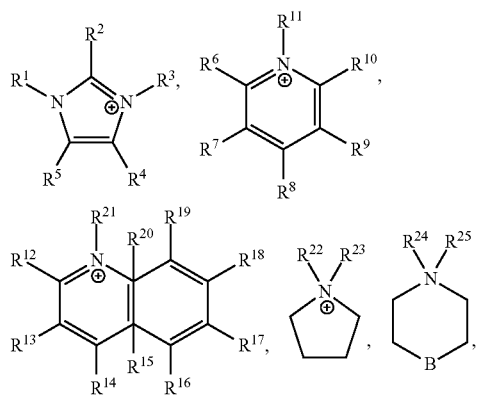

and $R^{30}R^{31}R^{32}R^{33}P^+$, wherein $R^1$ to $R^{25}$ and $R^{30}$ to $R^{33}$ each are independently hydrogen, an alkyl or heteroalkyl having 1 to 20 carbon atoms, an alkenyl or heteroalkenyl having 1 to 20 carbon atoms, an alkoxyl or heteroalkoxyl having 1 to 20 carbon atoms, an aryl or heteroaryl having 4 to 20 carbon atoms, a fluoroalkyl having 1 to 20 carbon atoms, or cyano group; B is carbon, oxygen or nitrogen.

2. The rigid polyurethane foam according to claim 1, wherein the anion $X^-$of the ionic liquid is selected from the group consisting of halogen, $R^{41}SO_3^-$, $PR^{42}_iF_{6-i}^-$, $SbR^{42}_iF_{6-i}^-$, $R^{43}R^{44}N^-$, $R^{45}OSO_3^-$, $R^{46}CO_2^-$, $PR^{47}_jO_{4-j}^-$, $BR^{48}_kF_{4-k}^-$, $NO_3^-$, $AlCl_4^-$, $Al_2Cl_7^-$, $FeCl_4^-$ and $ClO_4^-$; wherein $R^{41}$ is a hydrogen, an alkyl having 1 to 20 carbon atoms, an alkenyl having 1 to 20 carbon atoms, an alkoxyl having 1 to 20 carbon atoms, an aryl or heteroaryl having 4 to 20 carbon atoms, or a fluoroalkyl having 1 to 20 carbon atoms, $R^{42}$ is a fluoroalkyl having 1 to 20 carbon atoms where $0 \leq i \leq 6$, $R^{43}$ or $R^{44}$ are independently a hydrogen, an alkyl having 1 to 20 carbon atoms, an alkenyl having 1 to 20 carbon atoms, an alkoxyl having 1 to 20 carbon atoms, a fluoroalkyl having 1 to 20 carbon atoms, cyano, or $R'SO_2$, wherein $R'$ is a hydrogen, an alkyl having 1 to 20 carbon atoms, or a fluoroalkyl having 1 to 20 carbon atoms, $R^{45}$ is a hydrogen, an alkyl having 1 to 20 carbon atoms, an alkoxyl having 1 to 20 carbon atoms, or a fluoroalkyl having 1 to 20 carbon atoms, $R^{46}$ is a hydrogen, an alkyl or heteroalkyl having 1 to 20 carbon atoms, an alkoxy having 1 to 20 carbon atoms, or a fluoroalkyl having 1 to 20 carbon atoms, $R^{47}$ is an alkyl having 1 to 20 carbon atoms, or an alkoxyl having 1 to 20 carbon atoms where $0 \leq j \leq 4$ and $R^{48}$ is a fluoroalkyl having 1 to 20 carbon atoms where $0 \leq k \leq 4$.

3. The rigid polyurethane foam according to claim 1, wherein the ionic liquid is at least one selected from those represented by Formulae 3 to 9:

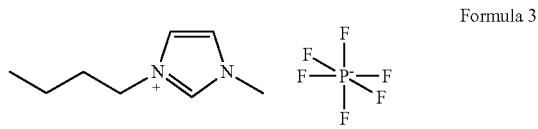

Formula 3

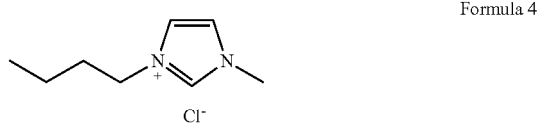

Formula 4

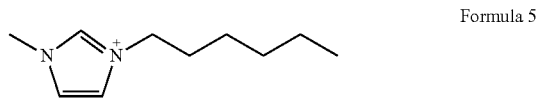

Formula 5

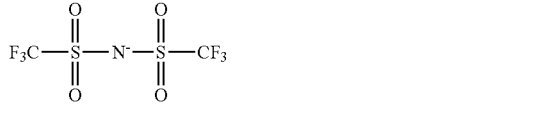

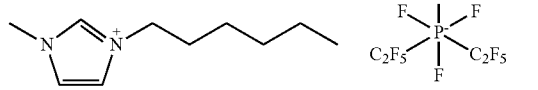

Formula 7

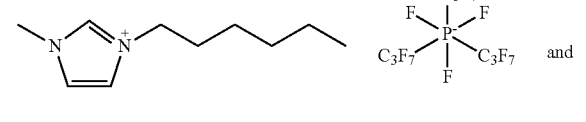

Formula 8 and

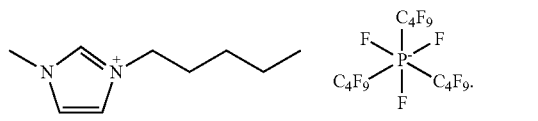

Formula 9

4. The rigid polyurethane foam according to claim 1, wherein discrete cells in the polyurethane foam have an average particle diameter ranging from about 150 to about 300 micrometers.

5. The rigid polyurethane foam according to claim 1, wherein the polyurethane foam has a thermal conductivity of not more than about 20.7 milli-watts per meter Kelvin.

6. The rigid polyurethane foam according to claim 1, wherein the polyurethane foam has a density ranging from about 25 to about 35 kilograms per cubic meter.

7. The rigid polyurethane foam according to claim 1, wherein the ionic liquid comprises cations or anions having halogen groups.

8. The rigid polyurethane foam according to claim 1, wherein the ionic liquid includes cations based on imidazolium, pyridinium, ammonium, pyrrolidinium, quaternary ammonium or quaternary phosphonium.

9. An insulation material comprising the rigid polyurethane foam as set forth in claim 1.

* * * * *